United States Patent
Gilreath et al.

(10) Patent No.: US 10,807,891 B1
(45) Date of Patent: Oct. 20, 2020

(54) OZONE CIRCULATED CLEANING WATER APPARATUS AND METHOD

(71) Applicants: Chris Gilreath, Rogers, AR (US); Kim G. Sweet, Rogers, AR (US); Thomas B. Pedersen, Fayetteville, AR (US)

(72) Inventors: Chris Gilreath, Rogers, AR (US); Kim G. Sweet, Rogers, AR (US); Thomas B. Pedersen, Fayetteville, AR (US)

(*) Notice: Subject to any disclaimer, the term of this patent is extended or adjusted under 35 U.S.C. 154(b) by 323 days.

(21) Appl. No.: 15/583,376

(22) Filed: May 1, 2017

Related U.S. Application Data (63) Continuation-in-part of application No. 14/561,218, filed on Dec. 5, 2014, now Pat. No. 9,782,053.

(60) Provisional application No. 62/330,191, filed on May 1, 2016.

(51) Int. Cl.
*A61L 2/18* (2006.01)
*C02F 1/78* (2006.01)
*A47L 15/42* (2006.01)

(52) U.S. Cl.
CPC .............. *C02F 1/78* (2013.01); *A47L 15/424* (2013.01); *A47L 15/4219* (2013.01); *A47L 15/4236* (2013.01); *A47L 2401/10* (2013.01); *A47L 2601/08* (2013.01)

(58) Field of Classification Search
CPC ........... C02F 1/78; A47L 15/424; A61L 2/183
See application file for complete search history.

(56) References Cited

U.S. PATENT DOCUMENTS

| | | | |
|---|---|---|---|
| 2,388,753 A | 11/1945 | Mallmann et al. | 21/58 |
| 5,560,831 A * | 10/1996 | Bladen | C02F 1/56 134/111 |
| 7,022,225 B1 * | 4/2006 | Clawson | B01D 19/0063 210/188 |
| 7,967,800 B2 * | 6/2011 | Chewins | A61L 2/0088 604/289 |
| 9,150,443 B2 | 10/2015 | Hengsperger et al. | 1/78 |
| 9,174,845 B2 | 11/2015 | Lynn | 13/11 |
| 2005/0139243 A1 * | 6/2005 | Hay | B01D 21/0006 134/104.2 |
| 2005/0252538 A1 * | 11/2005 | Vernon | B82Y 30/00 134/94.1 |
| 2006/0260658 A1 * | 11/2006 | Niedzwiecki | B01D 17/08 134/105 |
| 2015/0164300 A1 * | 6/2015 | Gilreath | A47L 15/4219 134/56 D |

* cited by examiner

*Primary Examiner* — Joseph L. Perrin
*Assistant Examiner* — Irina Graf
(74) *Attorney, Agent, or Firm* — Keisling & Pieper PLC; David B. Pieper; Trent C. Keisling (57) ABSTRACT

An ozone sanitizing circulating water apparatus and method using a recirculating water pickup, pump, and water quality sensors for providing a water stream to a mixing venturi that is also connected to ozone generators to supply the water to a dispensing faucet. A capturing hood is flowably connected to a fan and an ozone neutralization system to capture and render inert any excess ozone generation. A fresh water valve, user inputs, operation indicators, and ozone generators are all connected to a control system for monitoring and control of the system to maintain safe and effective operation.

14 Claims, 6 Drawing Sheets

OZONE CIRCULATED CLEANING WATER APPARATUS AND METHOD

CROSS-REFERENCE TO RELATED APPLICATIONS

This application claims priority to and is a continuation in part of U.S. Provisional application 62/330,191, filed by Gilreath and Pederson on May 1, 2016 entitled Off-Gas Destruct Faucet Assembly System, Apparatus, and Method and also claims priority to and is a continuation in part of U.S. patent application Ser. No. 14/561,218 by Gilreath et al. on Dec. 5, 2014 entitled Water Conserving Cleaning System, Apparatus, and Method. Both of these applications are hereby incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in circulating water systems for sinks and dipper wells. More particularly, the invention relates to improvements particularly suited for recycling and treating water for a reduction in water use by normal sinks, constant flow sinks, and dipper well type sinks. In particular, the present invention relates specifically to a recirculation water quality system with ozone treatment and excess ozone collection and neutralization.

2. Description of the Known Art

As will be appreciated by those skilled in the art, ozone treatment systems are known in various forms. Patents disclosing information relevant to bird guards include: U.S. Pat. No. 2,388,753, issued to Mallmann et al., on Nov. 13, 1945 entitled Apparatus and method for sanitizing; U.S. Pat. No. 9,150,443, issued to Hengsperger et al. on Oct. 6, 2015 entitled holding tank-less water ozonating system using electrolytic decomposition of water; and U.S. Pat. No. 9,174,845, issued to Lynn on Nov. 3 2015 entitled ozonated liquid dispensing unit. Each of these patents is hereby expressly incorporated by reference in their entirety.

From these prior references it may be seen that the prior art is very limited in its teaching and utilization, and an improved ozone circulated cleaning water apparatus and method is needed to overcome these limitations.

SUMMARY OF THE INVENTION

The present invention is directed to an improved ozone circulated cleaning water apparatus and method using a recirculating water pickup and ozone generators supplying a mixing venture with ozone and a dispensing faucet, hood, and neutralization system capturing excess ozone generation. In accordance with one exemplary embodiment of the present invention, an excess ozone collection hood is provided flowably connected to an ozone neutralizer and a fan to capture and render inert any excess ozone generated by the system. In accordance with another exemplary embodiment of the invention, a recirculation pump, quality sensors, fresh water valve, collection fan, user inputs, operation indicators, and ozone generators are all connected to a control system for monitoring and control of the various aspects of the system to maintain safe and effective operation for the use environment. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

As shown in FIGS. 1-8 of the drawings, one exemplary embodiment of the present invention is generally shown as an ozone liquid recirculation system 100 for use with a dipper well or sink 10. Dipper wells are a continuous flow subset of sinks 10 and may utilize a different control structure as discussed infra, but for now they will be referred to in the general term sink 10. Sinks 10 generally include a basin 11 formed with a top rim 12 connected to a bottom 14 by a side wall 16. The sinks 10 maintain a water level 18 above the drain 20 by either plugging the drain or utilizing a using a stand pipe 30 to extend the drain opening above the bottom 14 of the sink 10. While the water level in a plugged drain sink can be set at multiple levels, the top of the stand pipe 30 defines the overflow level of the sink 10 in constant flow or dipper well types of sinks 10 and is used by the present invention as the water level in the dipper well type of sink 10. When a variable level plugged drain type of sink is used, a water level sensor may be connected to the controller to verify a proper water level for operation of the system 100.

The ozone liquid recirculation system 100 includes a shrouded faucet assembly 200 and a recirculation drain bowl 300 connected to a main cabinet 400.

The faucet assembly 200 includes a sink faucet 210 with a faucet tube 212 extending down into the sink 10 to a below water level faucet output aperture 214. By having the outlet aperture 214 below water level one can eliminate any water fall type of disturbance of the ozone water 262 to maintain the concentration of ozone in the water. The faucet output aperture 214 is located above the bottom aperture 232 of the faucet shroud 220 so that any ozone that is not absorbed by the water will form bubbles and rise within the faucet shroud 220 and can be captured for neutralization. The distances from the bottom aperture 232 to the faucet outlet aperture 214 are controlled by the designed flow of the system 100 because as the flow through the system increases, the water current carrier the bubbles farther into the sink 10. One working system uses a faucet shroud 220 with the faucet output aperture 214 approximately half way down the shroud 220 and then the flow was optimized until substantially all of the ozone bubbles were collected. The faucet output aperture 214 can also be directed to create a circulation within the sink 10 to ensure proper mixing of the ozone water 262 into the sink 10.

Figures 5, 6:
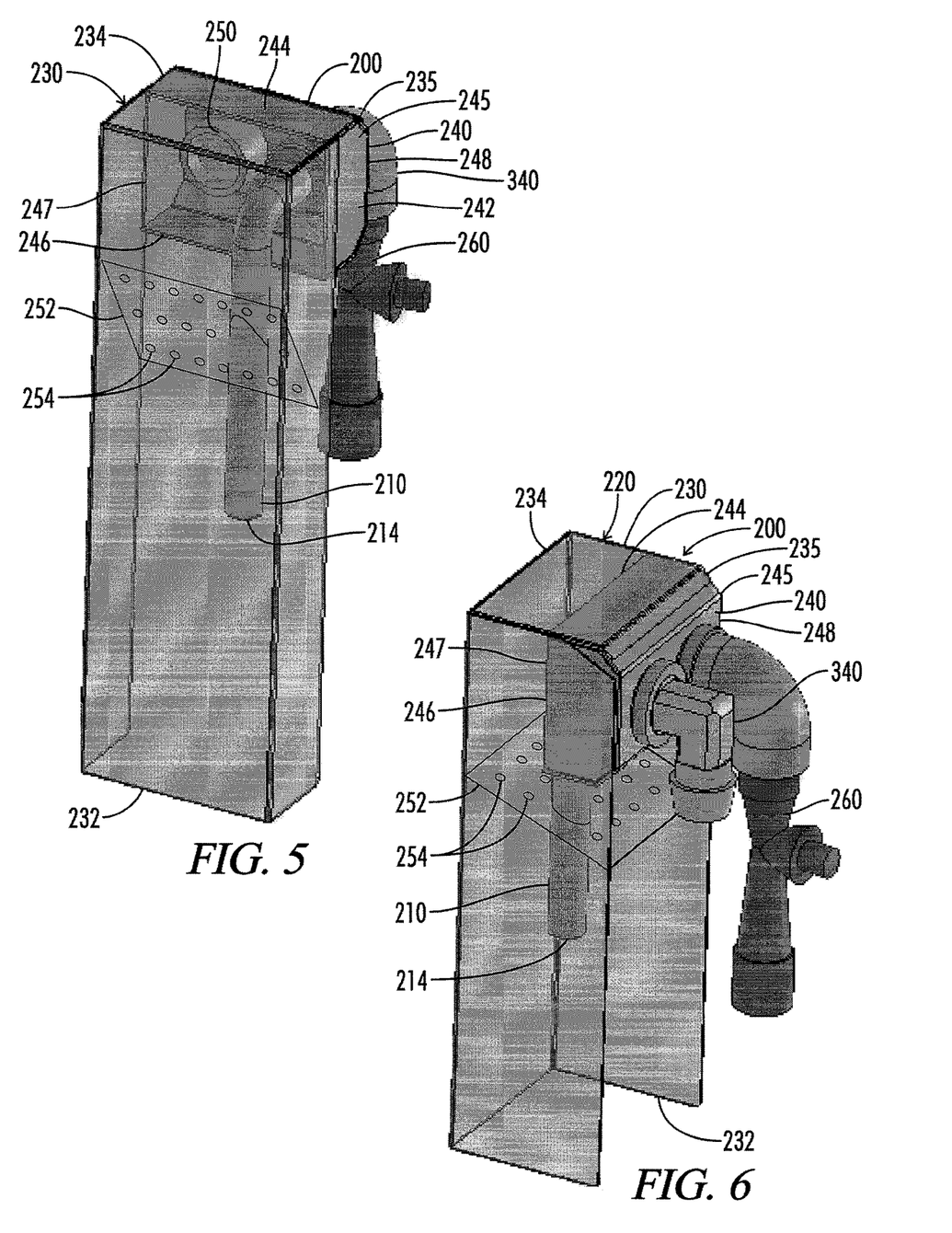
FIG. 5 is a front perspective view of the hooded faucet assembly.
FIG. 6 is a back perspective view of the hooded faucet assembly.

The faucet shroud 220 includes a shroud cover 230 that has a below water level bottom aperture 232 to allow the ozone water 262 to flow out into the sink basin 11. In the embodiment shown, the sink side wall 16 is used to form the back wall of the faucet shroud 220 such that only a top wall 234 with a shroud locking angle 235, side walls 236, and a front wall 238 are needed. The faucet shroud 220 is held against the sink side wall 16 by the mounting on the shroud base 240. The shroud base 240 includes a base body 242 with a support top 244 defining a base top angle 245. When the faucet shroud 220 is mounted on the shroud base 240, the shroud locking angle 235 engages the base top angle 245 so that gravity pulls the shroud down and the angles force the shroud back against the sink side wall 16. Note that the faucet shroud 220 could also be made with a back wall if that is preferred, but the construction described allows easy access to the base front 246 for access to the faucet tube and the gas collection port 250. The shroud base 240 includes base sides 247 spaced to allow for installation of the shroud side wall 236 over the shroud base 240 and a base back 248 providing a clean smooth surface for easy cleaning. Note that the gas collection port 250 is located above the sink basin 11 to minimize the possibility of water entering the gas collection port 250. A foam reduction screen 252 with perforations 254 can be mounted to the faucet tube 212 above the water level to pop foam bubbles such that only the excess gas gets to the gas collection port 250 and the foam is retained in the sink 10.

The gas collection port is flowably connected to the gas collection pipe 340 to carry the excess gas to the ozone neutralization chamber 440.

On the back side of the faucet assembly 200 we can see the ozone and water treatment venturi 260 that is flowably connected to treat mixed water 332 with ozone gas 432 to create ozone water 262 and the supply ozone water 262 to the faucet tube 212. Mixed water 332 is a combination of fresh water 462 and recirculating water supplied by the mixed water pipe 330. The ozone gas 432 is provided from the ozone generators 430 by the gas supply pipe 350. Note that this is an above sink water level mixing venturi 260 so that the ozone water 262 will drain through the faucet tube 212 into the sink basin 11 when the system is operation and when it is in standby mode. The water ventrui 260 orifice is a 0.1" diameter in our preferred dipper well application and is a 0.4" diameter in our sink applications. A MAZZEI 584C is a good example and is available from Mazzei Injector Company. LLC 500 Rooster Drive Bakersfield, Calif. 93307-9555 USA. The size of ventri 260 is important in this application because food particles will be circulating through the water in the system and prior art hydrophobic membranes get clogged with these particles, and the small ventrui orifices of the prior art systems required only fresh filtered water be utilized. Prior art system used high valve pressure that led to pump problems with low service life of the system. In contrast, the present system allows for lower pressures by putting the ozone into the water and then collecting the bubbles at atmospheric pressure at the faucet output aperture 214.

Figure 1:
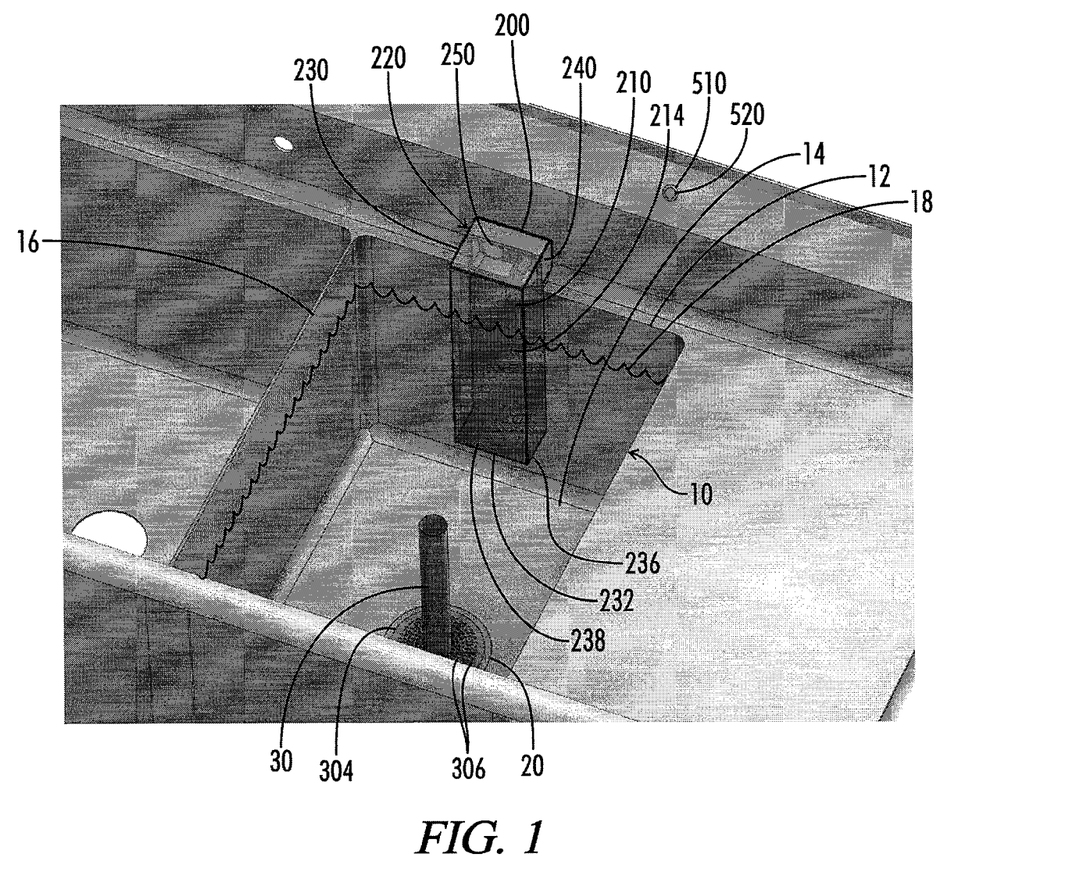
FIG. 1 is a top perspective view of a sink utilizing the present invention.
Figure 2:
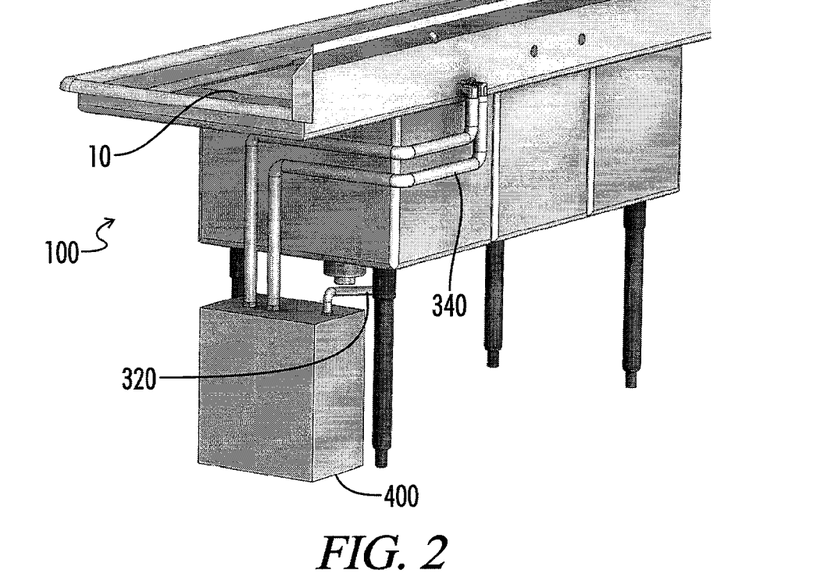
FIG. 2 is a back perspective view of a sink utilizing the present invention.
Figure 3:
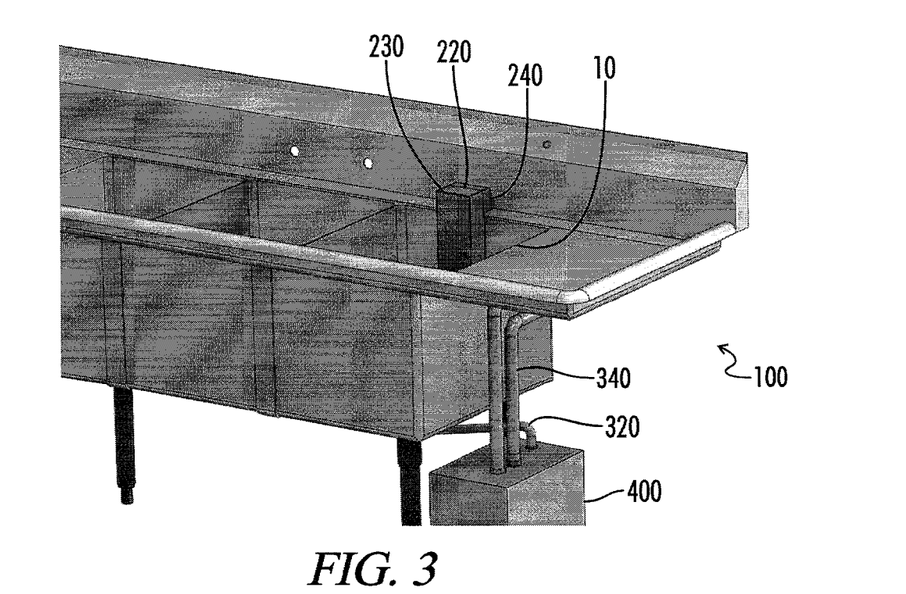
FIG. 3 is a front perspective view of a sink utilizing the present invention.
Figure 4:
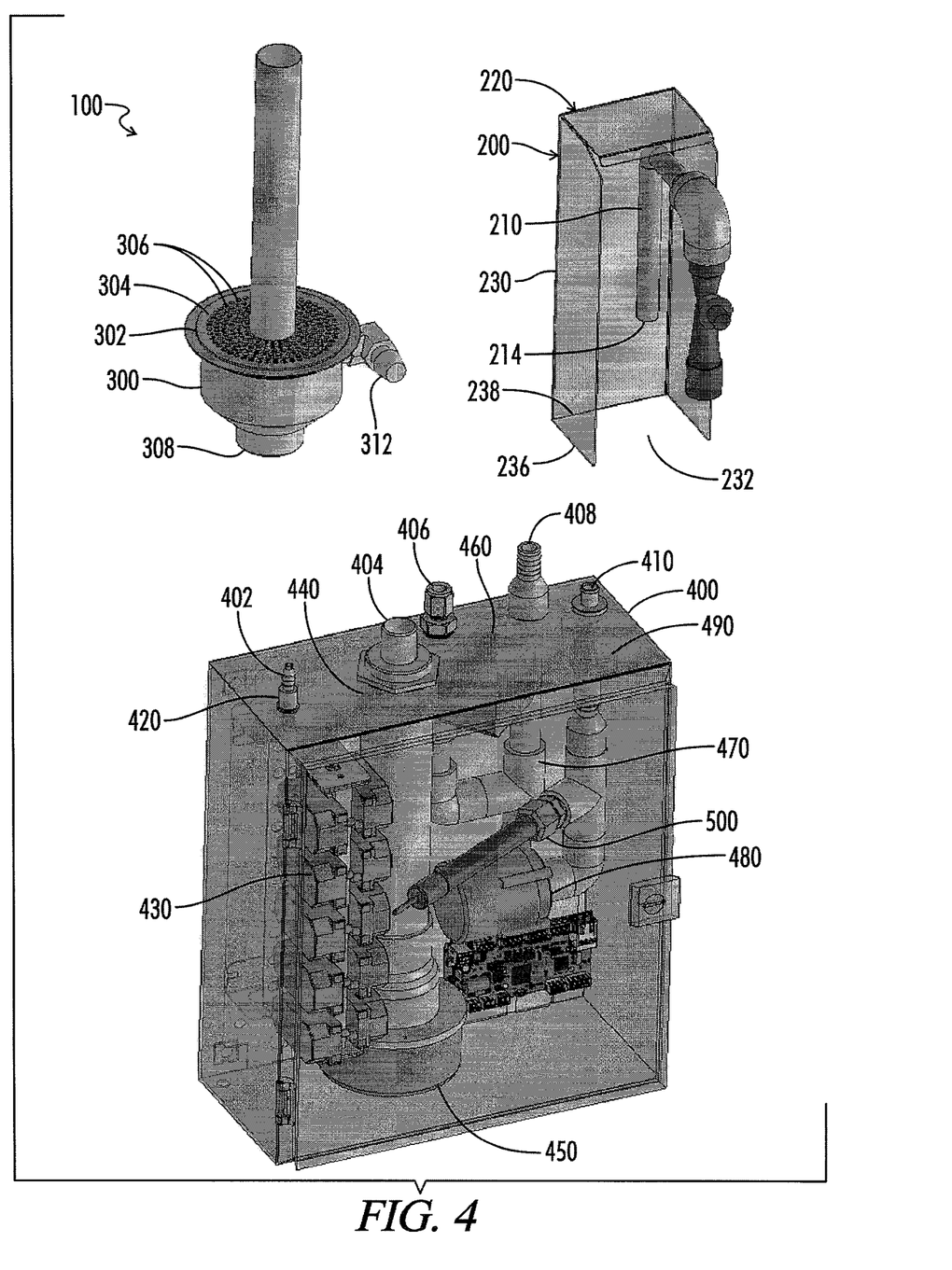
FIG. 4 is a schematic perspective view of the components of present invention.

In the embodiment shown, a recirculation drain bowl 300 is utilized so that an easy retrofit may be done to standard sink without having to modify the structure of the sink basin 11. The recirculation bowl 300 includes an upper collection aperture 302 with a recirculation strainer 304 to keep large food particles in the sink basin 11. The strain apertures 306 can be sized to keep the orifice in the venturi 360 unclogged. The recirculation bowl 300 includes a lower drain aperture 308 and stand tube holder 310 connected as a standard sink drain, but also includes recirculation aperture 312 located below the recirculation strainer 304 on the side of the drain bowl 300 to draw water out of the sink to be treated with ozone. The recirculation aperture 312 is flowably connected by the recirculation water pipe 320 to the mixing joint 470.

Figure 7:
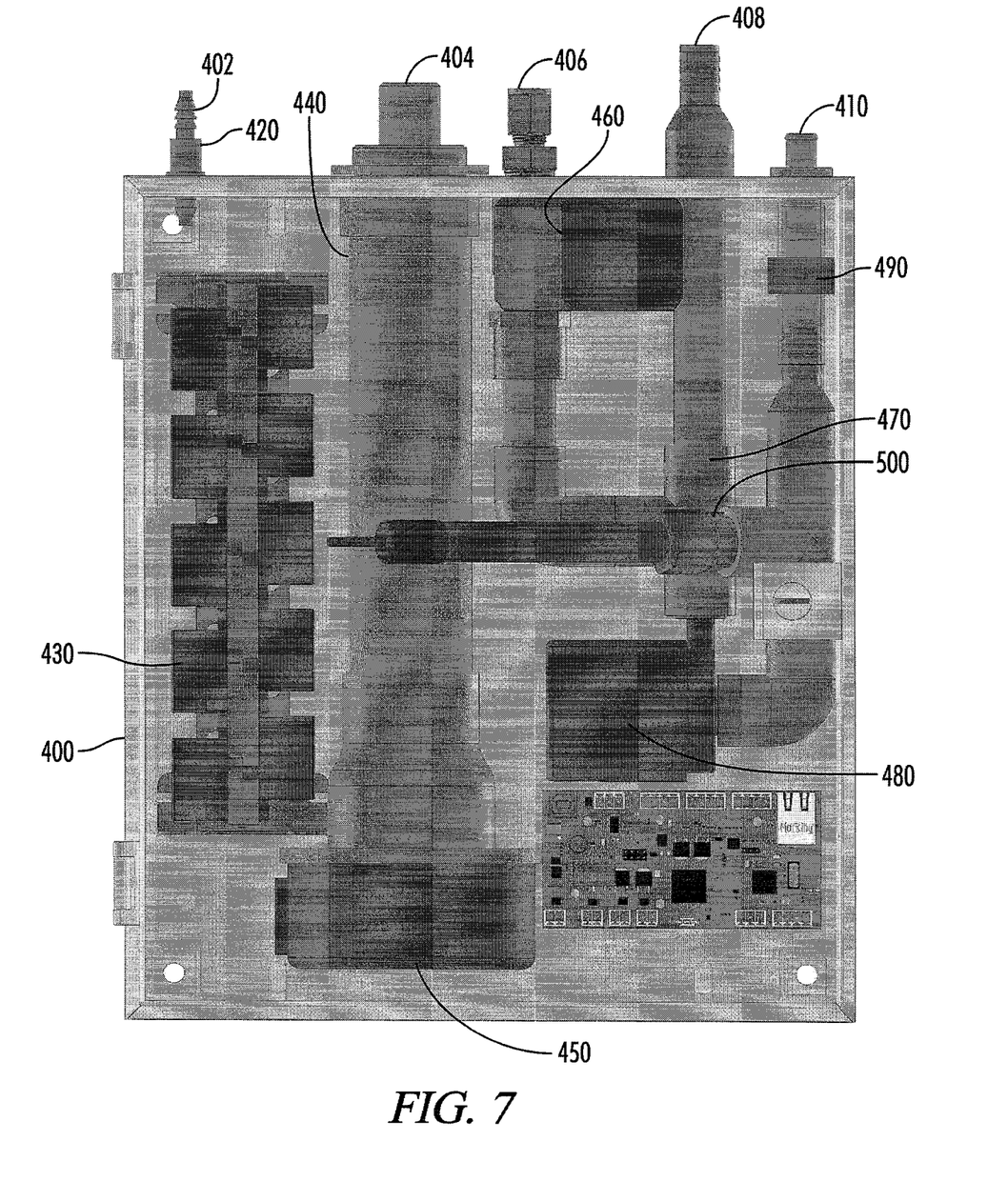
FIG. 7 is a schematic perspective view of the main cabinet component layout.

The main cabinet 400 includes a generated ozone output 402 connecting the ozone generator 430 to the gas supply pipe 350; a collected ozone input 404 connecting the ozone neutralization chamber 440 to the gas collection pipe 340; a fresh water input 406 receiving fresh water 462 and sending it to the fresh water valve 460; a faucet output 408 sending mixed water 332 through the mixed water pipe 330; a sink water return 410 receiving recirculation water 322 thought the recirculation water pipe 320; a power input 412 for powering the controller 600; a button input 414 providing user input to the controller 600, and an indicator output 416 providing use indicators or conditions to the user.

The generated ozone output 402 is connected through a generator protection check valve 420 to the ozone generator 430 to protect the ozone generator 430 from any back water flow that may occur. The ozone generator 430 generates the ozone gas 432 that is provided through the gas supply pipe 350 to the mixing venturi 360. The amount of ozone gas 432 produced by the ozone generator 430 is controlled by the generator output 610 of the controller 600 with either simple pulse width modulated on/off signals or variable strength signals depending on the model of ozone generator 430 selected.

The ozone neutralization chamber 440 is a CARULITE® based destruction type chamber connected between the gas collection pipe 340 and the fan 450. CARULITE is available from CARUS CORPORATION, 315 Fifth St., Peru, Ill. 61354.

The fan 450 draws a negative pressure through the ozone neutralization chamber 440 back to the gas collection port 250 to draw back any excess ozone from the bubbles. Note that the fan 450 exhausts the extra oxygen created by the ozone neutralization chamber 440 in proximity to the ozone generator 430 to enhance its operation in this main cabinet 400 embodiment. When a compacted system 100 is needed, the ozone neutralization chamber 440 and fan can be placed adjacent to the faucet 210 or inside the shroud 220 with an exhaust near the sink 10. This configuration is useful on small dipper well types of continuous flow sinks 10.

The fresh water valve 460 provides fresh water 462 to the mixing joint 470. The valve is operable from a fully closed to open position and it is controlled by the controller 600.

The mixing joint 470 is connected to the fresh water valve 460 to receive fresh water 462; the recirculation water pipe 320 to receive recirculation water 322; and outputs to the mixed water pipe 330 the mixed water 332 that is the combined fresh water 462 and recirculation water 322. The pump 480, a optical turbidity sensor 490, and an oxidation reduction potential sensor 500 may be placed between the recirculation water pipe 320 and the mixing joint 470. By monitoring and controlling the current through the electric motor powering the pump, the controller 600 controls the pump 480 and can sense when water is being recirculated and when the sink 10 is empty. Both preferred embodiments use the pump 480 and the turbidity sensor 490, but the oxidation reduction potential sensor 500 is currently only used in large sink embodiments due to the size and expense of the sensor.

A standard control button 510 is connected through the button input 414 to the controller 600, and a simple operation indicator 520 such as an led or display is connected to the controller 600 through the indicator output 416. The control button 510 can provide multiple presses during a time period to control the status of the unit through the controller 600. For example: a single press of the button 510 can be used for on/off; multiple button 510 presses within a time period of five seconds can place the unit in a standby mode; or a long press of the button 510 can be used for off, or to indicate a full system flush. Similarly, a simple operation indicator such as an LED light could have a continuous green displayed for ON, a continuous Red for OFF, a flashing green for ready, but in standby mode, or a flashing red indicating that the system needs service.

The controller 600 is a ARDUINO microcontroller provided by ARDUINO, LLC LIMITED LIABILITY COMPANY MASSACHUSETTS 72 Oak Street. #4 Somerville MASSACHUSETTS 02143. The controller 600 can be setup to run in various modes. For example there can be a continuous mode where there is always supposed to be water in the sink and constant treatment, an on/off mode controlled by the button 510 that fills the sink and runs the ozone treatment recirculation until the pump current indicates that the water has been drained by the user, a standby mode to maintain the system such as a time cycle with an on/off period such as one half hour off and then one hour on when the system senses that the sink 10 is not being used, or even a back flush mode to turn the fresh water supply on with sufficient pressure and flow to flow out of both of the other connections of the mixing joint 470 through the faucet output aperture 214 and backwards through the recirculation aperture 312.

The controller 600 monitors the turbidity input 601 from the turbidity sensor 490 and the ORP input 602 from the ORP sensor 500 to monitor when the sanitation level is reached. The threshold level of turbidity from the turbidity sensor 490 is generally set by the user's desire to have the sink water look clear transparent instead of a translucent, milky, or cloudy appearance even though the translucent or cloudier water would still provide sufficient cleaning capabilities.

The controller controls the fan 450 speed through the fan output 609.

From the ORP sensor 500, a baseline reading of around 200 to 600 mV is generally found in fresh water and the controller looks for a sanitation level of around 750 mv minimum out of a 0-2000 mV output sensor 500 such as a SENSOREX S268CD-ORP produced by SENSOREX 11751 Markon Dr. Garden Grove, Calif. 92841 USA. Power input 604 is provided by a simple wall plug providing 120 V input.

The pump current output 606 is used to monitor the pump 480 condition. By monitoring the current draw of the pump 480, the presence of water in the sink 10 can be detected.

The fresh water valve control output 608 are used to control the fresh water valve 460 to fill the sink 10, to completely shut off the flow of fresh water 462 when not needed, and to add fresh water 462 when the turbidity of the recirculating water 322 as detected by the turbidity sensor 490 gets above the desired threshold level. The fresh water 462 coming into the system raises the sink water level above the stand pipe 30 to flush water out of the sink 10 and down the drain 20. Note that the fresh water valve 460 can be opened enough to flow water backwards through the pump 480 and past the sensors to flush the system 100 if necessary.

While it is preferable to use wireless communication, a communication port 612 can also be connected to the controller 600.

Note that all materials in contact with ozone should be of an ozone inert material such as stainless steel.

Figure 8:
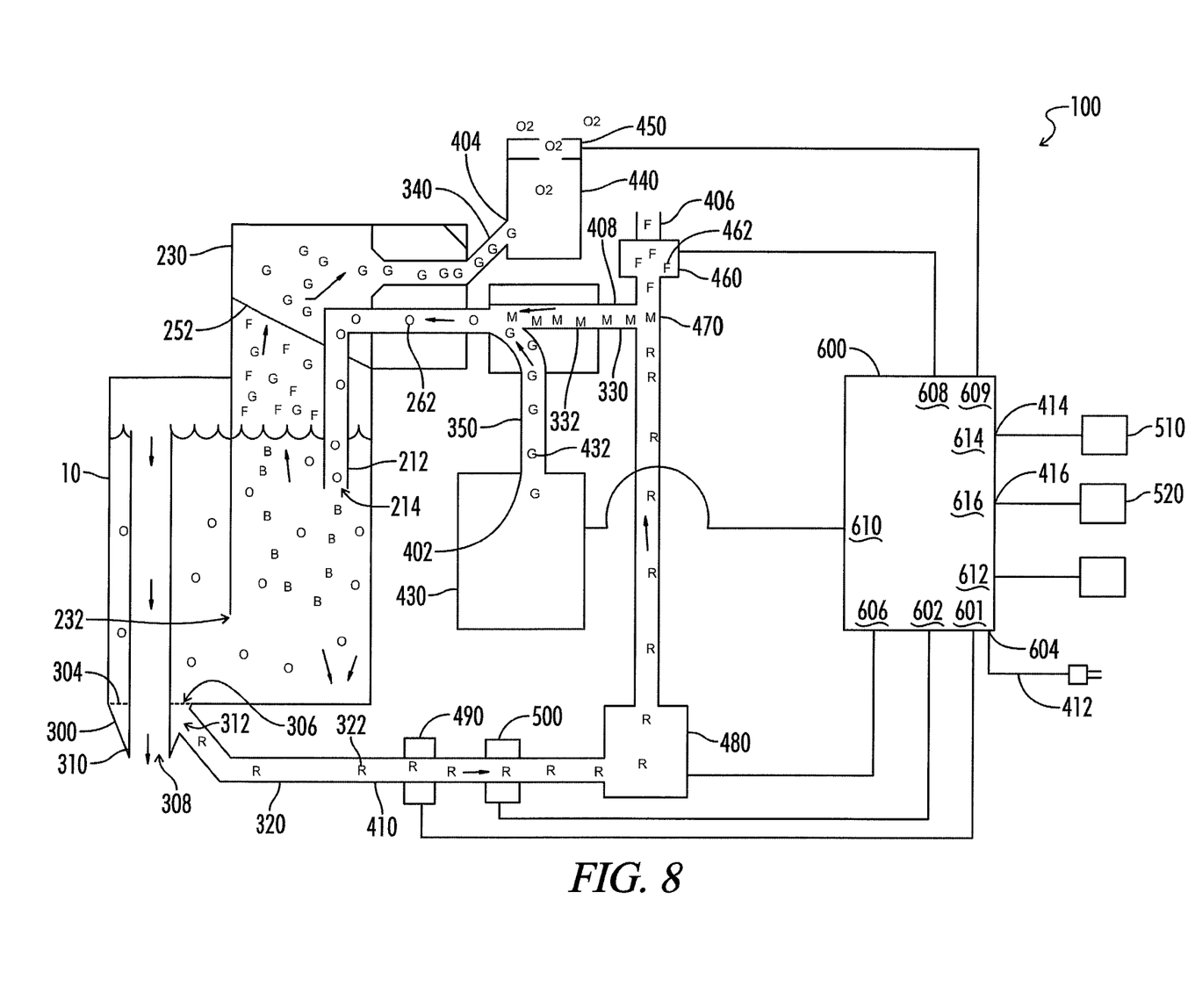
FIG. 8 is a schematic perspective view of the system.

In FIG. 8:
R represents recirculation water.
F represents fresh water.
M represents mixed water.
G represent ozone gas.
O represents ozone water 262.
B represents ozone bubbles.
F represents ozone foam.
O2 represents oxygen.
The arches appearing to form "UUUUU" represents the water level Reference numerals used throughout the detailed description and the drawings correspond to the following elements:
Sink 10
  Top rim 12
  Bottom 14
  Side wall 16
  Water level 18
Drain 20
Stand pipe 30
ozone liquid recirculation system 100
Faucet assembly 200
  Sink faucet 210
    Faucet tube 212
    Faucet output aperture 214
  Faucet shroud 220
    shroud cover 230
      below water level bottom aperture 232
      top wall 234
        shroud locking angle 235
      side walls 236
      front wall 238
    shroud base 240
      base body 242
        support top 244 base top angle 245
base front 246
base sides 247
base back 248
gas collection port 250
foam reduction screen 252
perforations 254
water treatment venturi 260
Ozone water 262
Recirculation drain bowl 300
  Upper collection aperture 302
  Recirculation strainer 304
    Strain apertures 306
    Lower drain aperture 308
    Stand tube holder 310
  Recirculation aperture 312
recirculation water pipe 320
recirculation water 322
mixed water pipe 330
mixed water 332
gas collection pipe 340
gas supply pipe 350
main cabinet 400
generated ozone output 402
collected ozone input 404
fresh water input 406
faucet output 408
sink water return 410
power input 412
button input 414
indicator output 416
generator protection check valve 420
ozone generator 430
ozone gas 432
ozone neutralization chamber 440
fan 450
fresh water valve 460
fresh water 462
mixing joint 470
pump 480
turbidity sensor 490
oxidation reduction potential sensor 500
control button 510
operation indicator 520
controller 600
  turbidity input 601
  ORP input 602
  Power input 604
  Pump current output 606
  Fresh valve control output 608
  Generator output 610
  Communication port 612
  Button input 614
  Indicator output 616

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having.' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. An ozone liquid recirculation system apparatus for use with water, the apparatus comprising:
    a sink including a bottom with a drain, the sink holding the water at a water level using a stand pipe to extend the drain above the bottom of the sink;
    a water level sensor connected to a controller to verify a proper water level for operation of the apparatus;
    an ozone generator providing ozone gas;
    a venturi injector connected to the ozone generator to introduce ozone gas to generate ozone water;
    a faucet assembly including a faucet output aperture fluidly connected to the venture injector, the faucet assembly positioned to direct the ozone water into the sink where excessive ozone is released as bubbles;
    a shroud cover including a gas collection port, the shroud cover fixably mounted to and extending into the sink below the water level, the shroud cover positioned in proximity to the faucet outlet aperture to surround the faucet outlet aperture to capture the ozone bubbles and allow them to pop to form ozone gas; and
    a recirculation pump creating a flow from the drain, past the venturi injector and to the faucet output aperture.

2. The apparatus of claim 1, wherein the faucet output aperture is below the water level.

3. The apparatus of claim 1, the shroud cover including a bottom aperture below the water level.

4. The apparatus of claim 1, the shroud cover including a bottom aperture positioned below the water level and in relation to the faucet output aperture such that the bubbles are captured within the shroud cover.

5. The apparatus of claim 1, further comprising a foam reduction screen positioned within the shroud cover proximate to the gas collection port.

6. The apparatus of claim 1, the gas collection port fluidly connected to an ozone neutralization chamber.

7. The apparatus of claim 1, further comprising:
    a recirculation drain bowl with a recirculation aperture collecting sink water to create recirculation water; and
    the recirculation pump fluidly connected to the recirculation aperture and the faucet output aperture.

8. The apparatus of claim 7, further comprising:
    a recirculation strainer positioned adjacent the recirculation aperture.

9. The apparatus of claim 7, further comprising:
    an ozone neutralization chamber fluidly connected to the gas collection port.

10. The apparatus of claim 9, further comprising:
a fan connected to the ozone neutralization chamber to move the ozone gas to the ozone neutralization chamber.

11. The apparatus of claim 7, further comprising:
a fresh water valve controlling the flow of fresh water; and
a mixing joint mixing the fresh water and the recirculation water to form mixed water.

12. The apparatus of claim 7, further comprising:
a turbidity sensor positioned to monitor the recirculation water.

13. The apparatus of claim 7, further comprising:
an oxidation reduction potential sensor positioned to monitor the recirculation water.

14. The apparatus of claim 12, further comprising:
the controller connected to control operation of the ozone generator, the turbidity sensor, and the recirculation pump.

* * * * *